United States Patent
Zang et al.

(10) Patent No.: US 11,972,235 B2
(45) Date of Patent: Apr. 30, 2024

(54) NO-CODE METADATA-DRIVEN PROVISIONING OF WORKFLOW TASK USER INTERFACES

(71) Applicant: SAP SE, Walldorf (DE)

(72) Inventors: Yan Zang, Singapore (SG); Rasheed Abdul Azeez, Singapore (SG); Yi Quan Zhou, Singapore (SG)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 17/684,527

(22) Filed: Mar. 2, 2022

(65) Prior Publication Data

US 2023/0280983 A1 Sep. 7, 2023

(51) Int. Cl.
*G06F 8/34* (2018.01)
*G06F 40/56* (2020.01)

(52) U.S. Cl.
CPC .............. *G06F 8/34* (2013.01); *G06F 40/56* (2020.01)

(58) Field of Classification Search
CPC ............ G06F 8/34; G06F 40/56; G06Q 10/10
See application file for complete search history.

(56) References Cited

U.S. PATENT DOCUMENTS

| | | | |
|---|---|---|---|
| 9,448,770 B2 | 9/2016 | Zang et al. | |
| 9,552,404 B2 | 1/2017 | Zang et al. | |
| 9,575,749 B1* | 2/2017 | Howard | G06F 8/71 |
| 9,678,955 B2 | 6/2017 | Yao et al. | |
| 9,880,816 B2 | 1/2018 | Zang et al. | |
| 9,952,835 B2 | 4/2018 | Wang et al. | |
| 10,924,452 B1* | 2/2021 | Nikolayev | H04L 61/5046 |
| 2008/0184148 A1 | 7/2008 | Selig | |
| 2011/0225107 A1 | 9/2011 | Khosravy | |
| 2011/0276538 A1 | 11/2011 | Knapp et al. | |
| 2013/0198521 A1 | 8/2013 | Wu | |
| 2015/0089403 A1 | 3/2015 | Zhu et al. | |
| 2015/0170088 A1* | 6/2015 | Rizk | G06F 8/34 705/7.26 |
| 2016/0026717 A1 | 1/2016 | Kelsey et al. | |

(Continued)

OTHER PUBLICATIONS

U.S. Appl. No. 17/678,115, filed Feb 23, 2022, Zang et al.

(Continued)

*Primary Examiner* — Chat C Do
*Assistant Examiner* — Noor Alkhateeb
(74) *Attorney, Agent, or Firm* — Fish & Richardson P.C.

(57) ABSTRACT

Methods, systems, and computer-readable storage media for receiving user input representative of user selection of a set of decision elements to be included in a workflow task UI and a data object, each decision element being associated with a decision identifier, the workflow task UI including a container component and metadata, the container component storing parameters of the application at run-time, the metadata including logic that is executable within a view of the container component during run-time, during run-time use of the application: displaying the workflow task UI, and receiving user input to a decision element within the view of the container component, and in response, passing a decision identifier associated with the decision element from the container component to the metadata, and executing at least a portion of the logic of the metadata to update the decision identifier with a workflow backend to complete the task.

20 Claims, 11 Drawing Sheets

(56) References Cited

U.S. PATENT DOCUMENTS

| | | | |
|---|---|---|---|
| 2016/0253171 A1 | 9/2016 | Zang et al. | |
| 2017/0147190 A1* | 5/2017 | Twist | G06F 3/0481 |
| 2018/0308141 A1* | 10/2018 | Beck | G06Q 20/347 |
| 2019/0019128 A1 | 1/2019 | Fox, Jr. et al. | |
| 2020/0234242 A1* | 7/2020 | Parks | G06F 8/34 |
| 2021/0149688 A1* | 5/2021 | Newell | G06F 40/186 |
| 2023/0070063 A1* | 3/2023 | Beach | G06F 3/0482 |
| 2023/0266978 A1 | 8/2023 | Zang et al. | |

OTHER PUBLICATIONS

Developers.sap.com [online], "Mobile Development Kit" Aug. 2019, [retrieved on Feb. 18, 2022], retrieved from : URL<https://developers.sap.com/topics/mobile-development-kit.html>, 2 pages.

Adlytic Marketing [online], "Squarespace Tutorials—File Upload on Forms" Jan. 2020, retrieved on Dec. 29, 2022, retrieved from URL<https://www.youtube.com/watch?v=dnUyoMdFkpo>, 13 pages [Video Submission].

Final Office Action in U.S. Appl. No. 17/,678,115, filed Nov. 18, 2022, 24 pages.

Final Office Action in U.S. Appl. No. 17/,678,115, filed Nov. 13, 2023, 26 pages.

Github.com [online], "Refactor file upload from web U1 and temporary storage" Feb. 2020, retrieved on Dec. 29, 2022, retrieved from URL<https://github.com/IQSS/dataverse/issues/6656>, 14 pages.

Heloise Montini [online], "How to Receive and Upload Files with a Web Form" Jan. 21, 2021, Internet Archive: Wayback Machine URL<https://web.archive.org/web/20210121132925/https://www.mightyforms.com/blog/receive-and-upload-files-with-a-web-form>, retrieved on Dec. 8, 2023, </https://www.mightyforms.com/blog/receive-and-upload-files-with-a-web-form>, 23 pages.

Non-Final Office Action in U.S. Appl. No. 17/,678,115, filed Jul. 3, 2023, 21 pages.

Non-Final Office Action in U.S. Appl. No. 17/,678,115, filed Sep. 1, 2022, 21 pages.

\* cited by examiner

FIG. 3A

NO-CODE METADATA-DRIVEN PROVISIONING OF WORKFLOW TASK USER INTERFACES

BACKGROUND

Users interact with computer-executed applications to perform a multitude of tasks. For example, in an enterprise setting, users can interact with one or more of an enterprise resource planning (ERP) application, a customer relationship management (CRM) application, and a human capital management (HCM) application to perform tasks in support of operations of an enterprise. To facilitate these interactions, applications are programmed with user interfaces (UIs), which can also be referred to as UI elements. Users interact with the application by providing input to and receiving output from UI elements. Example UI elements can include object pages, list pages, and analytics pages. Applications are increasingly becoming cloud-based applications, which are executed within cloud platforms. For example, users interact with cloud-based applications through client-side UIs. In some examples, applications enable users to execute tasks as part of a workflow.

SUMMARY

Implementations of the present disclosure are directed to generation of workflow task user interfaces (UIs). More particularly, implementations of the present disclosure are directed to a no-code, metadata-driven approach to create workflow task UIs that enable users to interact with one or more cloud-based applications to execute one or more tasks of a workflow.

In some implementations, actions include receiving, by a design-time environment of an application platform, user input representative of user selection of a set of decision elements to be included in a workflow task UI and at least one data object that is to be affected by input to the workflow task UI, each decision element being associated with a decision identifier, providing, by the design-time environment, the workflow task UI as one or more computer-executable files that are executable to provide a container component and metadata, the container component storing parameters of the application at run-time, the metadata including logic that is executable within a view of the container component during run-time, during run-time use of the application: displaying the workflow task UI to enable a user to execute a respective task of a workflow, and receiving user input to a decision element within the view of the container component, and in response, passing a decision identifier associated with the decision element from the container component to the metadata, and executing at least a portion of the logic of the metadata to update the decision identifier with a workflow backend to complete the task.

These and other implementations can each optionally include one or more of the following features: the decision identifier is passed using Hypertext transfer protocol (HTTP) post message; the parameters include a data model of the task and an identifier of a service entity associated with an instance of the workflow task UI; the data model and the identifier of the service entity are stored in a client data model of a runtime of the application; the parameters are passed from the container component to the metadata using a HTTP post message; displaying the workflow task UI includes populating data of the data object within the workflow task UI and displaying decision elements of the set of decision elements withing the workflow task UI; and the workflow is defined within a computer-readable workflow model that that defines tasks and decision points of tasks, each decision element in the set of decision elements being associated with a decision point of the workflow model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3E depict an example editor interface for no-code, metadata-driven development of workflow task UIs in accordance with implementations of the present disclosure.

Like reference symbols in the various drawings indicate like elements.

DETAILED DESCRIPTION

Figure 1:
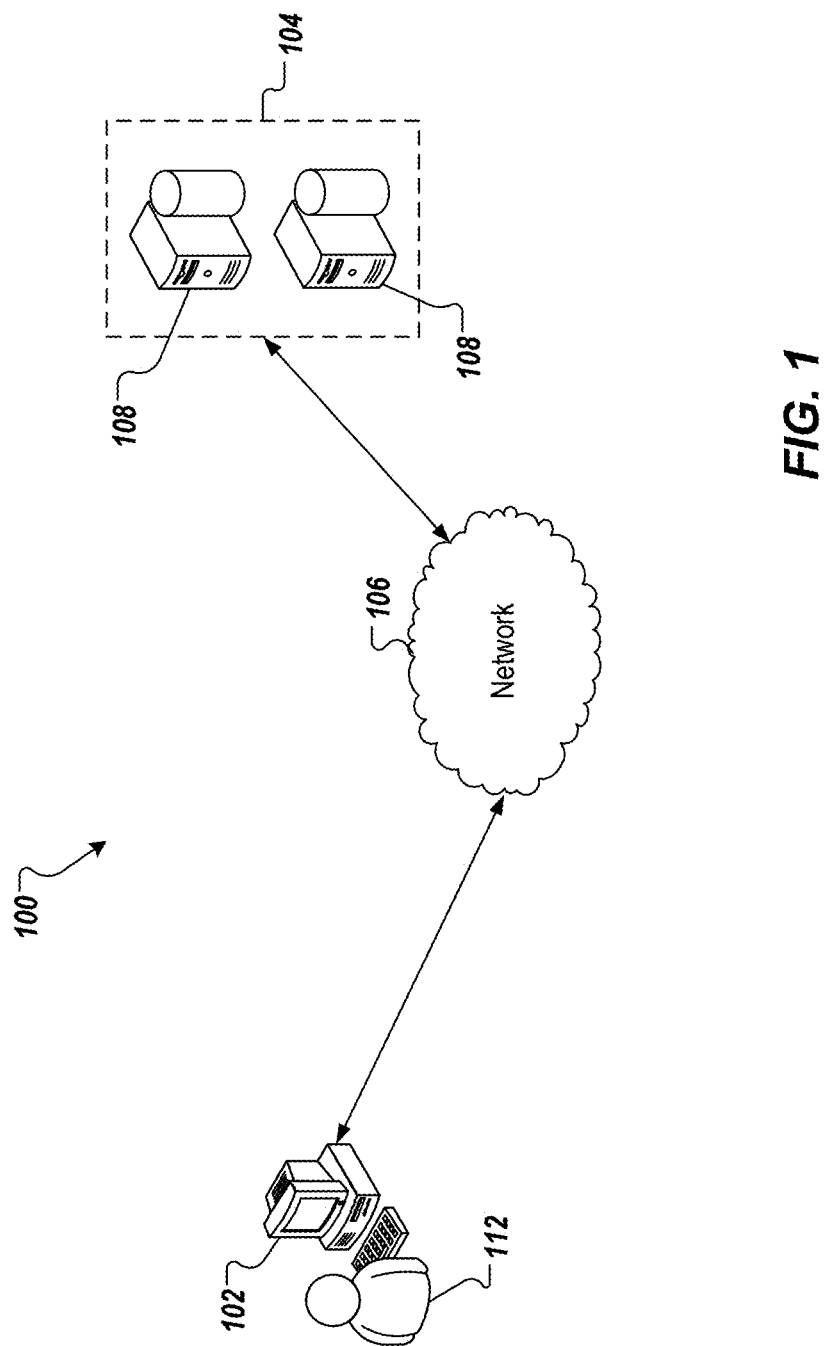
FIG. 1 depicts an example architecture that can be used to execute implementations of the present disclosure.

Implementations of the present disclosure are directed to generation of workflow task user interfaces (UIs). More particularly, implementations of the present disclosure are directed to a no-code, metadata-driven approach to create workflow task UIs that enable users to interact with one or more cloud-based applications to execute one or more tasks of a workflow.

Implementations can include actions of receiving, by a design-time environment of an application platform, user input representative of user selection of a set of decision elements to be included in a workflow task UI and at least one data object that is to be affected by input to the workflow task UI, each decision element being associated with a decision identifier, providing, by the design-time environment, the workflow task UI as one or more computer-executable files that are executable to provide a container component and metadata, the container component storing parameters of the application at run-time, the metadata including logic that is executable within a view of the container component during run-time, during run-time use of the application: displaying the workflow task UI to enable a user to execute a respective task of a workflow, and receiving user input to a decision element within the view of the container component, and in response, passing a decision identifier associated with the decision element from the container component to the metadata, and executing at least a portion of the logic of the metadata to update the decision identifier with a workflow backend to complete the task.

To provide further context for implementations of the present disclosure, and as introduced above, users interact with computer-executed applications to perform a multitude of tasks. For example, in an enterprise setting, users can interact with one or more of an enterprise resource planning (ERP) application, a customer relationship management (CRM) application, and a human capital management (HCM) application to perform tasks in support of operations of an enterprise. To facilitate these interactions, applications are programmed with user interfaces (UIs), which can also be referred to as UI elements. Users interact with the application by providing input to and receiving output from UI elements. Example UI elements can include object pages, list pages, and analytics pages.

Applications are increasingly becoming cloud-based applications, which are executed within cloud platforms. For example, users interact with cloud-based applications through client-side UIs. In some examples, applications enable users to execute tasks as part of a workflow. In some instances, a task can require a user to attach, delete, and/or view one or more documents that are to be provided to the cloud-based application through a document service. For example, the document service enables communication between a client and a backend data store. An example document service can be provided as an Open Data Protocol (OData) service. The OData can be described as an open protocol that enables query-able and interoperable representational state transfer (REST) application programming interfaces (APIs) to be created and consumed. Using REST APIs, clients are able to publish and edit resources using hypertext transfer protocol (HTTP) messages. A resource can be defined within a data model and can be identified using a uniform resource indicator (URI).

Traditionally, creation and deployment of UIs that interact with OData services is a time- and resource-intensive task that is required to be performed by developers having comprehensive programming experience and skill in coding. This traditional requirement hinders the progress of developing and deploying cloud-based applications and is an inefficient use of technical resources (e.g., bandwidth, processors, memory). For example, development environments are provisioned on hardware to enable skilled developers to code and deploy applications with UIs that enable users to execute workflow tasks. Further, such development is executed in a development cycle that can include design, coding, testing, and deployment that can last days, if not weeks or even months.

In view of the above context, implementations of the present disclosure provide for generation of workflow task UIs within cloud platforms. In some implementations, a workflow tasks UI is representative and enables execution of a workflow task associated with one or more data objects. As described in further detail herein, the workflow task UI generated using a no-code, metadata-driven approach. As used herein, no-code refers to the absence of a dedicated developer and development environment to manually code UIs, which would then be tested and deployed over a development cycle (e.g., days, weeks).

In some examples, a control can be provided as a widget, which can be described as a UI that enables a user to interact with an application. For example, a widget can display information and can include UI elements that enable a user to interact with an application. In general, a web component can be described as browser feature that provides a standard component model and can include custom elements (e.g., APIs to define hypertext markup language (HTML) elements), a shadow document object model (DOM) (e.g., encapsulated DOM and styling, with composition), and HTML templates.

Implementations of the present disclosure provide one or more advantages. For example, implementations of the present disclosure provide a no-code, metadata driven approach that enables workflow task UIs to be developed and deployed in a time- and resource-efficient manner. More particularly, technical development details are off-loaded from developers enabling so-called citizen developers (e.g., users with little to no coding experience) to create workflow task UIs, such that, at run-time, workflow context data is passed from a workflow container application to the workflow task UI and task decisions are updated to workflow backend to complete the workflow. Further, implementations of the present disclosure obviate traditional code development phases, such as design, coding, and testing.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications.

In accordance with implementations of the present disclosure, the server system 104 can host an application platform for generating workflow task UIs within cloud platforms, as described herein. In some examples, the server system hosts an application platform, through which cloud-based applications including workflow task UIs are provided. In some examples, the user 112 can be responsible for execution of one or more workflow tasks using the cloud-based application(s) and can execute the task(s) using one or more workflow task UIs provisioned in accordance with implementations of the present disclosure.

Implementations of the present disclosure are described in further detail herein with reference to an example workflow and example workflow task UI. It is contemplated, however, that implementations of the present disclosure can be realized for any appropriate workflow and any appropriate workflow task UI. The example workflow includes an employee onboarding workflow, which can include a set of tasks to onboard an employee into information systems of an enterprise (e.g., a newly hired employee). Example tasks of the workflow can include, without limitation, inputting employee information and approving/rejecting onboarding. For example, a first user can be assigned the task of inputting employee information (e.g., first name, last name, address) that is stored in a data object (e.g., an employee data object, which stores data representative of employees), and a second user can be assigned the task of approving or rejecting onboarding of the employee at least partially based on the employee information. In some examples, a first workflow task UI is provided to enable the first user to input the employee information, and a second workflow task UI is provided to enable the second user to view the employee information, and a approve/reject onboarding of the employee.

In some implementations, workflows can be programmatically defined using workflow modelling. For example, a workflow can be visually defined as a workflow model using any appropriate modelling language. An example modelling language includes, but is not limited to, business process modelling notation (BPMN). In some examples, the workflow model defines tasks and decision points. Example tasks can include a user providing input to a system (e.g., inputting employee information for storage in an employee data object), and a user reviewing information and making a decision at a decision point (e.g., reviewing employee information and determining to approve/rejection an employee onboard request).

Figure 2:
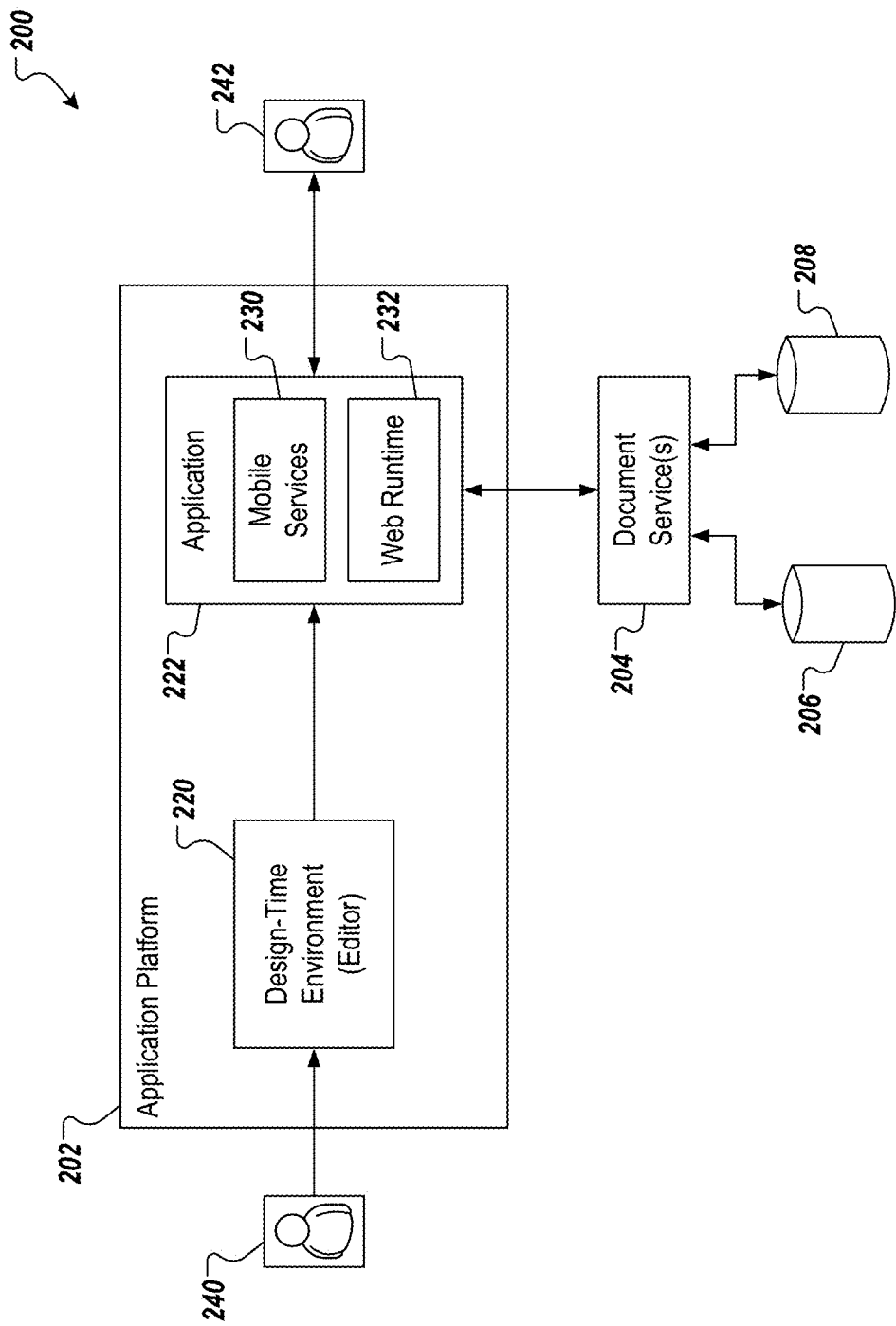
FIG. 2 depicts an example architecture in accordance with implementations of the present disclosure.

FIG. 2 depicts an example architecture 200 in accordance with implementations of the present disclosure. The example architecture 200 includes an application platform 202, a set of document services 204, and backend data stores 206, 208. In some examples, the backend data store 206 represents one or more enterprise-specific data stores. In some examples, the backend data store 208 represents one or more publicly accessible data stores (e.g., Internet-based data sources).

In general, the application platform 202 enables the development, deployment, and use of applications that enable users to execute workflow tasks in support of, for example, enterprise operations. An example application platform 202 includes the SAP Mobile Development Kit (MDK) provided by SAP SE of Walldorf, Germany. Although MDK is discussed herein for purposes of illustrating implementations of the present disclosure, implementations of the present disclosure can be realized using any appropriate application platform.

In the example of FIG. 2, the application platform 202 includes a design-time environment 220 and an application 222. The application 222 includes mobile services 230 and a web runtime 232. As described in further detail herein, the design-time environment 220 provides a web-based editor that enables users 240 to create applications, such as the application 222. In the context of MDK, the editor of the design-time environment 220 is provided as a SAP Business Application Studio space. In some examples, the mobile services (e.g., SAP Mobile Services) provide enterprise services that can include, but are not limited to, on-boarding, authentication, offline accessibility, and lifecycle management. In some examples, the web runtime 232 (e.g., MDK Web Runtime) is a runtime for the application 222. One or more end users 242 interact with the application 222 through a mobile client, which is provided as a native application that executes on a client device.

In some implementations, each document service 204 is provided as an OData service, through which the application 222 stores and/or accesses documents within one or more of the backend data stores 206, 208. As described in further detail herein, implementations of the present disclosure provide for no-code, metadata-driven development of workflow task UIs for applications, such as the application 222, that enable the user(s) 242 to interact with (e.g., attach, delete, view) documents stored within one or more of the backend data stores 206, 208.

In further detail, the editor of the design-time environment 220 can be provided as a what-you-see-is-what-you-get (WYSIWYG) editor that enables visual-based development of applications. In accordance with implementations of the present disclosure, the editor can be used by users (e.g., the user 240) for no-code, metadata-driven development of workflow task UIs, as described in further detail herein.

FIGS. 3A-3E depict an example editor interface 300 for no-code, metadata-driven development of workflow task UIs in accordance with implementations of the present disclosure. In some examples, the example editor interface 300 is provided by a design-time environment (e.g., the design-time environment 220 of FIG. 2).

Figure 3A:
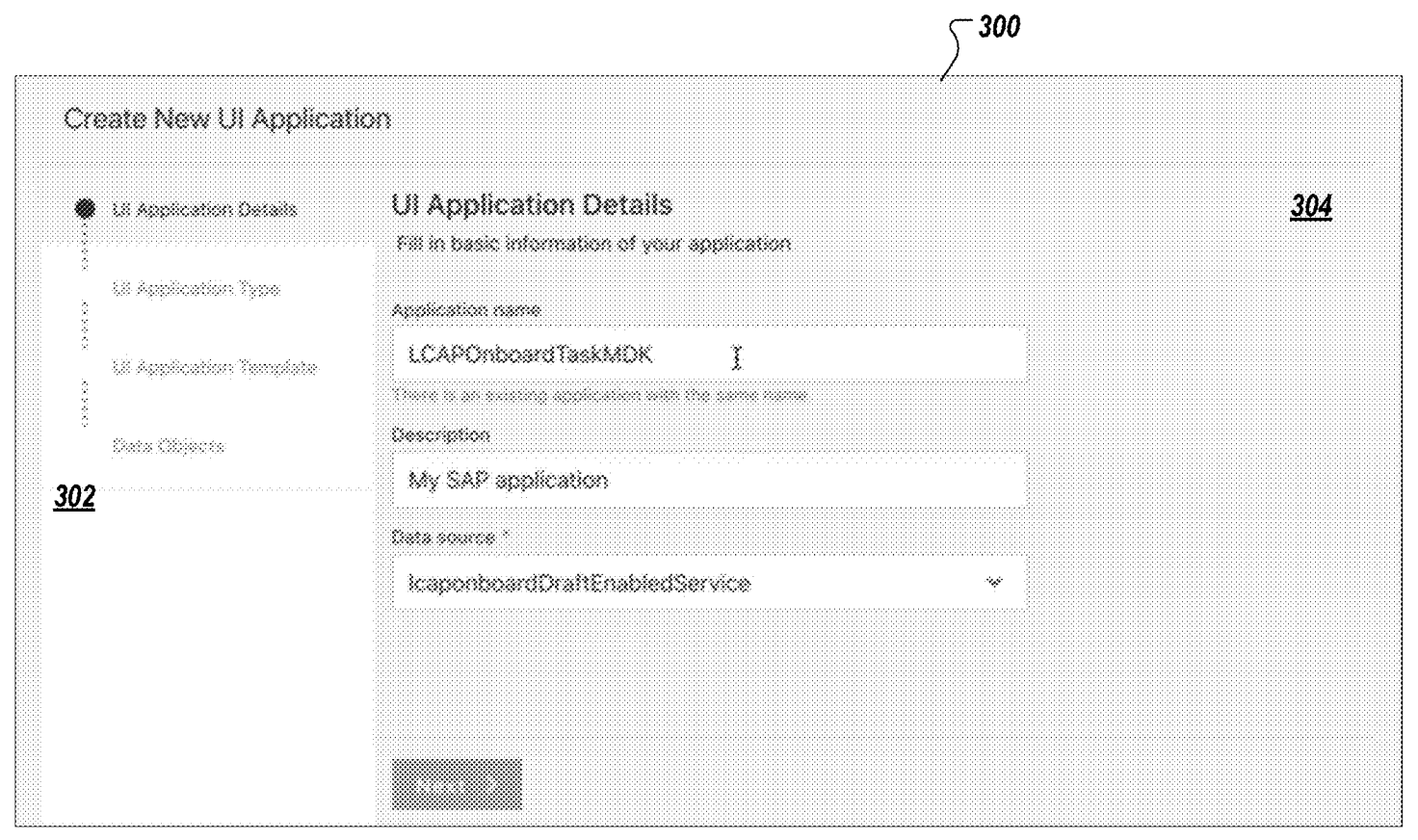

With particular reference to FIG. 3A, a user (e.g., the user 240 of FIG. 2) can open a UI application creation wizard in an editor (e.g., the editor of the design-time environment 220 of FIG. 2). In response, the editor interface 300 is displayed. In the example of FIG. 3A, the editor interface 300 includes a UI application menu 302 providing an outline of steps for creating a workflow task UI. In a first step (UI Application Details), a UI application details panel 304 is displayed and enables the user to input information relevant to the UI application. Example information includes, but is not limited to, application name, description, and data source.

Figure 3B:
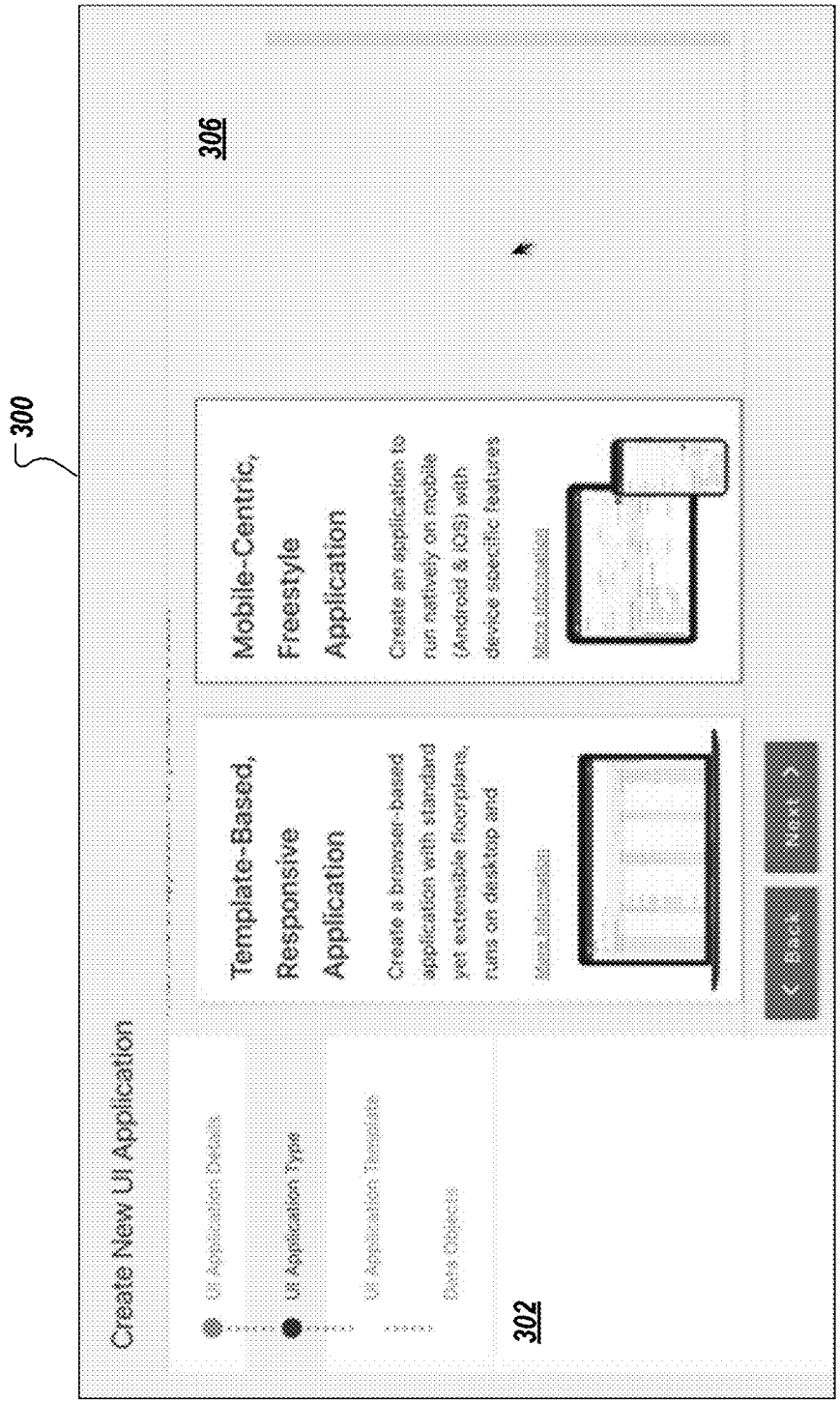

With particular reference to FIG. 3B, in a second step (UI Application Type), a UI application type panel 306 is displayed and enables the user to select an application type from a set of application types. Example application types include, but are not limited to, a browser-based application (e.g., accessed through a web browser executing on a desktop and/or laptop computer) and a mobile application (e.g., accessed through a client executing on a mobile device).

Figure 3C:
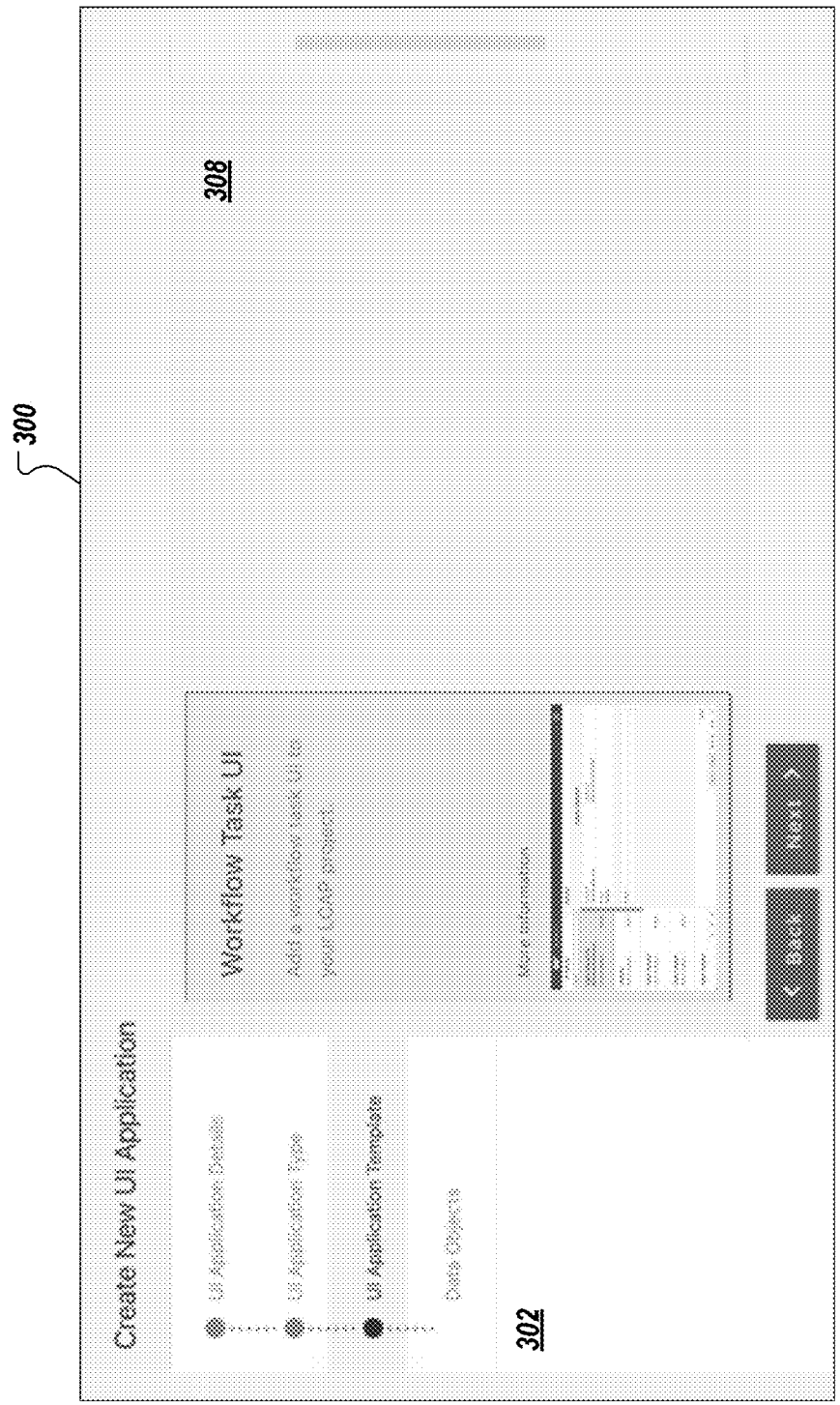

With particular reference to FIG. 3C, in a third step (UI Application Template), a UI selection panel 308 is displayed and enables the user to select a UI type from a set of UI types. An example UI type includes, but is not limited to, a workflow task UI. In the examples of FIG. 3C, and in accordance with implementations of the present disclosure, a workflow task UI is displayed.

Figure 3D:
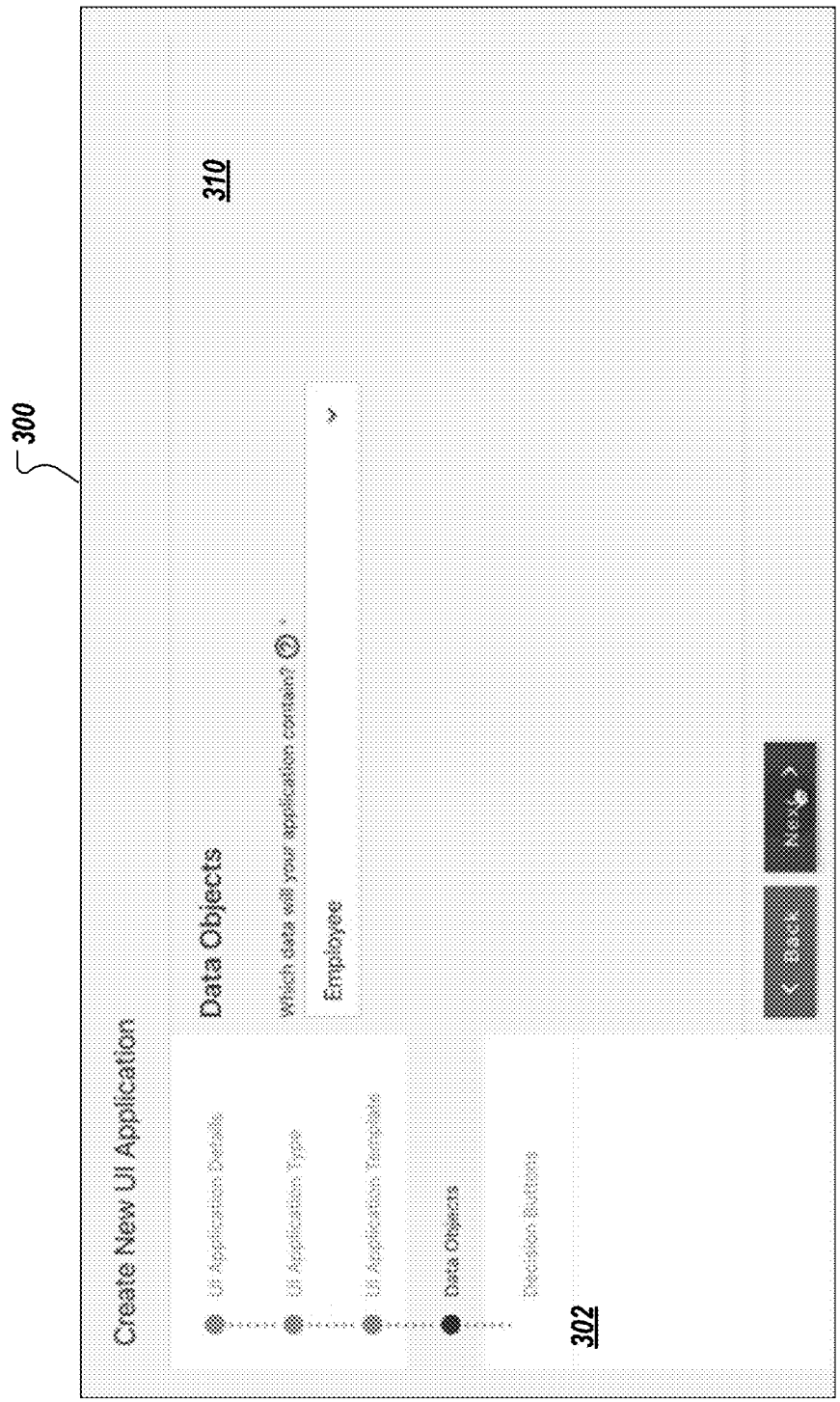

With particular reference to FIG. 3D, in a fourth step (Data Objects), a data object selection panel 310 is displayed and enables the user to select one or more data objects that users will be able to access through the workflow task UI. In some examples, a drop-down list of available data objects is displayed and the user can select a data object from the list of available data objects. In the example of FIG. 3D, an employee data object, which stores data representative of employees (e.g., first name, last name, address) has been selected.

Figure 3E:
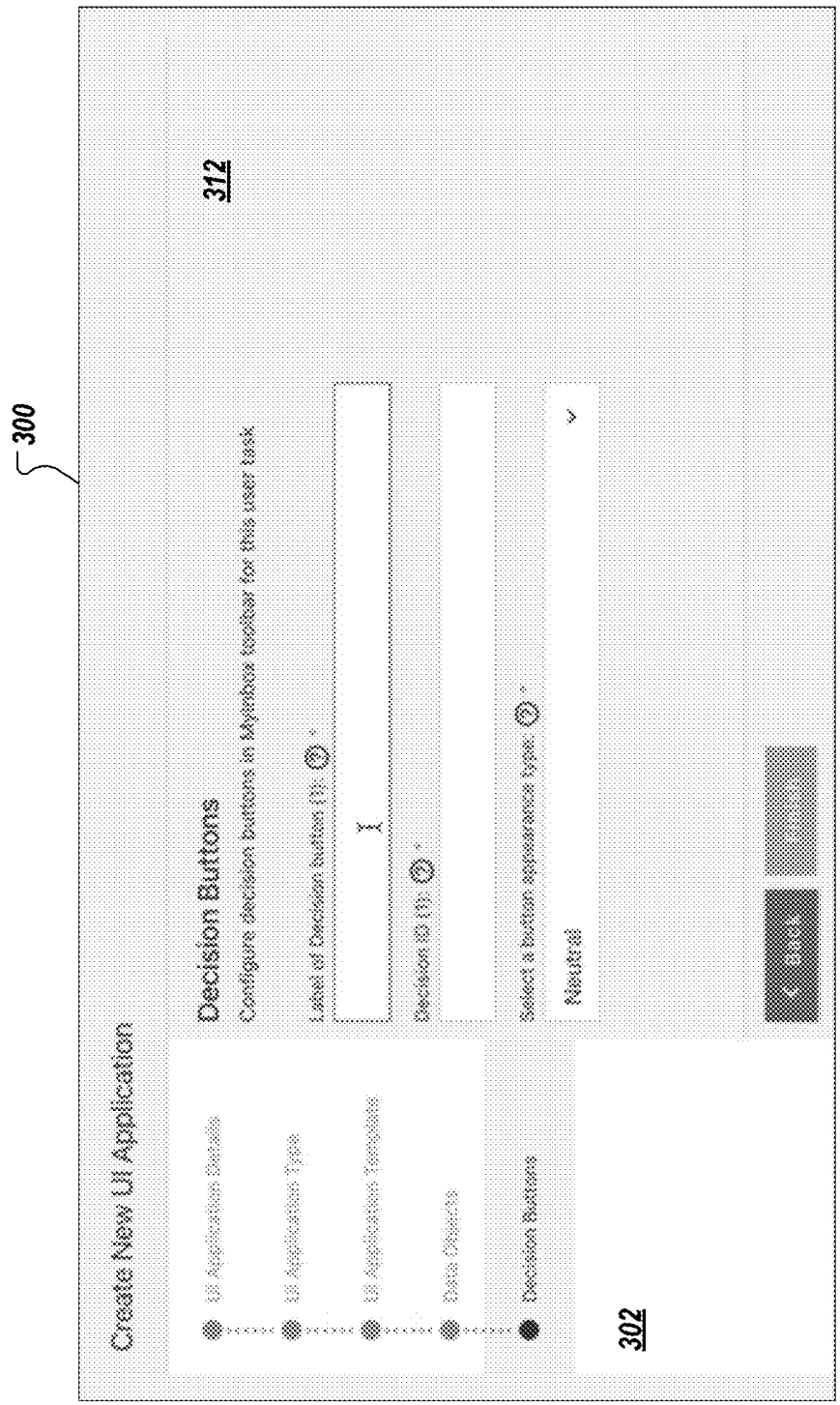

With particular reference to FIG. 3E, in a fifth step (Decision Buttons), a decision button panel 312 is displayed and enables the user to define one or more decision buttons (also referred to as UI elements and/or decision elements) to be included in the workflow task UI. In some examples, for each decision button, the user can input a label and can select an appearance type. Example appearance types can include, without limitation, neutral, positive, and negative. In some examples, at runtime, a visual treatment is applied to each button based on the respective appearance type. As depicted in FIG. 3E, a decision ID is assigned to each decision button. In some examples, the decision ID is assigned to the decision point defined in the underlying workflow model. For example, and as described above with reference to the example context of an employee onboard workflow, a decision button for APPROVE can be provided, with the decision ID of 'approve,' which corresponds to the approve decision point, and a decision button for REJECT can be provided, with the decision ID of 'reject,' which corresponds to the reject decision point. By selecting the 'Finish' button, generation of the workflow task UI is complete.

In some implementations, the generated workflow task UI includes multiple layers. Example layers include a container component layer and a metadata layer. In some examples, the container component layer includes a container component, such as UI5 component of HTML5. In some examples, the container component stores all of the parameters required by the workflow task UI that are to be retrieved from an application that the workflow task UI is executed within. An example application includes, without limitation, the Workflow My Inbox application provided by SAP SE. While the Workflow My Inbox application is discussed herein for purposes of non-limiting illustration, it is contemplated that implementations of the present disclosure can be realized using any appropriate application. Example parameters that are retrieved can include, without limitation, a data model (e.g., a data model of the workflow task that is to be executed) and an identifier of a service entity (e.g., OData service entity) associated with the instance of the workflow task UI. In some examples, the metadata layer includes logic that is executed within a frame (e.g., iframe) of the view of the component container component. This is represented in Listing 1, below, by way of example:

---
Listing 1: Example Metadata Layer
Integration in Component Layer
---

```
<mvc:View controllerName="MyApp.controller.View"
    xmlns:l="sap.ui.layout"
    xmlns:core="sap.ui.core"
    xmlns:mvc="sap.ui.core.mvc"
    xmlns:html="http://www.w3.org/1999/xhtml"
    xmlns="sap.m">
    <Panel class="mdkContainer" id="mdkcontainer">
        <html:iframe class="mdkframe" target='_top'
id="mdkframe" height="100%" width="100%">
        </html:iframe>
```

---
Listing 1: Example Metadata Layer
Integration in Component Layer
---

```
    </Panel>
</mvc:View>
```

In some implementations, the data model and the identifier of the service entity are passed from the container component to the metadata layer using a HTTP post message. This is represented by way of example in Listing 2, below:

---
Listing 2: Passing of Data Model and
Service Identifier between Layers
---

```
getMdkFrameWindow: function( ) {
let frameId = "mdkframe";
  if (frameId) {
    let mdkIframe =
document.getElementById(frameId);
      if (mdkIframe && mdkIframe.contentWindow) {
      return mdkIframe.contentWindow;
      }
    }
  return null;
}
let targetWindow = this._getMdkFrameWindow( );
window.addEventListener("message", event => {
  if (event.origin === window.location.origin) {
  if (event.data === "mdkframeReady" && targetWindow) {
    targetWindow.postMessage(WorkflowTaskContextData
, window.location.origin);
    }
  }
}
```

Within the metadata layer, both the data model (WorkflowTaskContextData model) and the identifier of the service entity are stored in a client data model of the runtime of the application. This is represented by way of example in Listing 3, below:

---
Listing 3: Storage of Data Model and Service
Identifier in Client Data Model
---

```
window.addEventListener("message", event => {
    if (event.origin === window.location.origin && event.data
&& event.data instanceof Object && event.data.message ===
"WorkflowTaskContextData") {
        console.log(event.data);
        window.localStorage.setItem("WorkflowTaskContextData",
JSON.stringify(event.data.contextData));
    }
}, false);
const workflowTaskContextData =
window.localStorage.getItem('WorkflowTaskContextData');
    if (workflowTaskContextData && Application.context) {
        const dataObj = JSON.parse(workflowTaskContextData);
        for (const key in dataObj) {
        if (Application.context.clientData[key]) {
            Object.assign(Application.context.clientData[key],
dataObj [key]);
        } else {
            Application.context.clientData[key] = dataObj [key];
        }
    }
}
```

More particularly, the data model is passed from the container component layer to the metadata layer through an API (e.g., targetWindow.postMessage API (HTTP post message) in Listing 2) and the data model is stored for retrieval as a client data model during run-time. For example, and with reference to Listing 3, the WorkflowTaskContextData model is stored in window.localStorage by the setItem method, and is retrieved from window.localStorage by the getItem method. The WorkflowTaskContextData model stored in the Application.context.clientData, which is the client data model of the runtime of the application.

As represented in Listing 4, below, metadata of the workflow task UI in application is provided. In some examples, both the data model (of the workflow task) and the identifier of the service entity are automatically bound to the corresponding UI controls and properties.

Listing 4: Binding of Data Model and Service Identifier to UI Control Properties

```
{
  "Caption": "Request",
  "Controls": [{
    "Sections": [{
      "KeyAndValues": [{
        "Value":
"{#Application/#ClientData/WorkflowUsertask/taskData/CreatedBy
}",
        "KeyName": "Created By"
      }, {
        "Value":
"{#Application/#ClientData/WorkflowUsertask/taskData/CreatedOn
}",
        "KeyName": "Created On"
      }, {
        "Value":
"{#Application/#ClientData/WorkflowUsertask/taskData/Priority}
",
        "KeyName": "Priority"
      }, {
        "Value": "",
        "KeyName": ""
      }],
      "Layout": {
        "NumberOfColumns": 2
      },
      "_Name": "SectionKeyValue0",
      "_Type": "Section.Type.KeyValue"
    }, {
      "KeyAndValues": [ ],
      "Layout": {
        "NumberOfColumns": 1
      },
      "Target": {
        "EntitySet": "capex",
        "Service": "/MyApp/Services/service1.service",
        "QueryOptions":
"$filter={{#Application/#ClientData/WorkflowUsertask/taskData/
capEntityFilter}}"
      },
      "_Name": "SectionKeyValue1",
      "_Type": "Section.Type.KeyValue"
    }],
    "_Name": "SectionedTable0",
    "_Type": "Control.Type.SectionedTable"
  }],
  "_Name": "Main",
  "_Type": "Page"
}
```

At runtime, the workflow task UI is rendered in the application. For example, the workflow task UI is rendered within the My Inbox application introduced above by way of example. In some examples, a representation of the workflow task is loaded, for example, on the lefthand side of an application interface and the workflow task UI with data populated is loaded on righthand side. In some examples, decision buttons that are configured during creation of the workflow task UI using the application creation wizard appear at the footer.

Figure 4A:
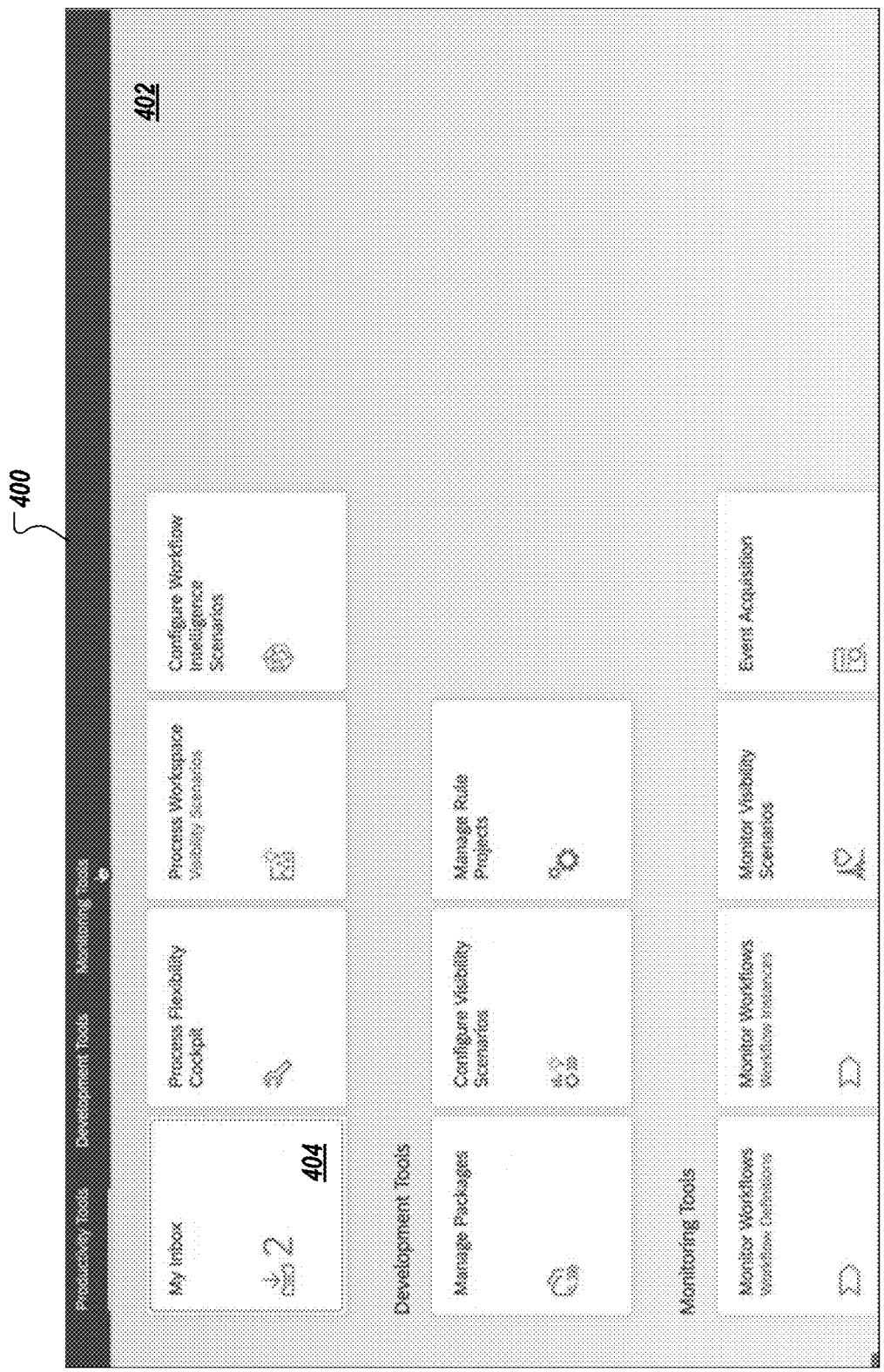
FIGS. 4A and 4B depict example UIs at runtime in accordance with implementations of the present disclosure.
Figure 4B:
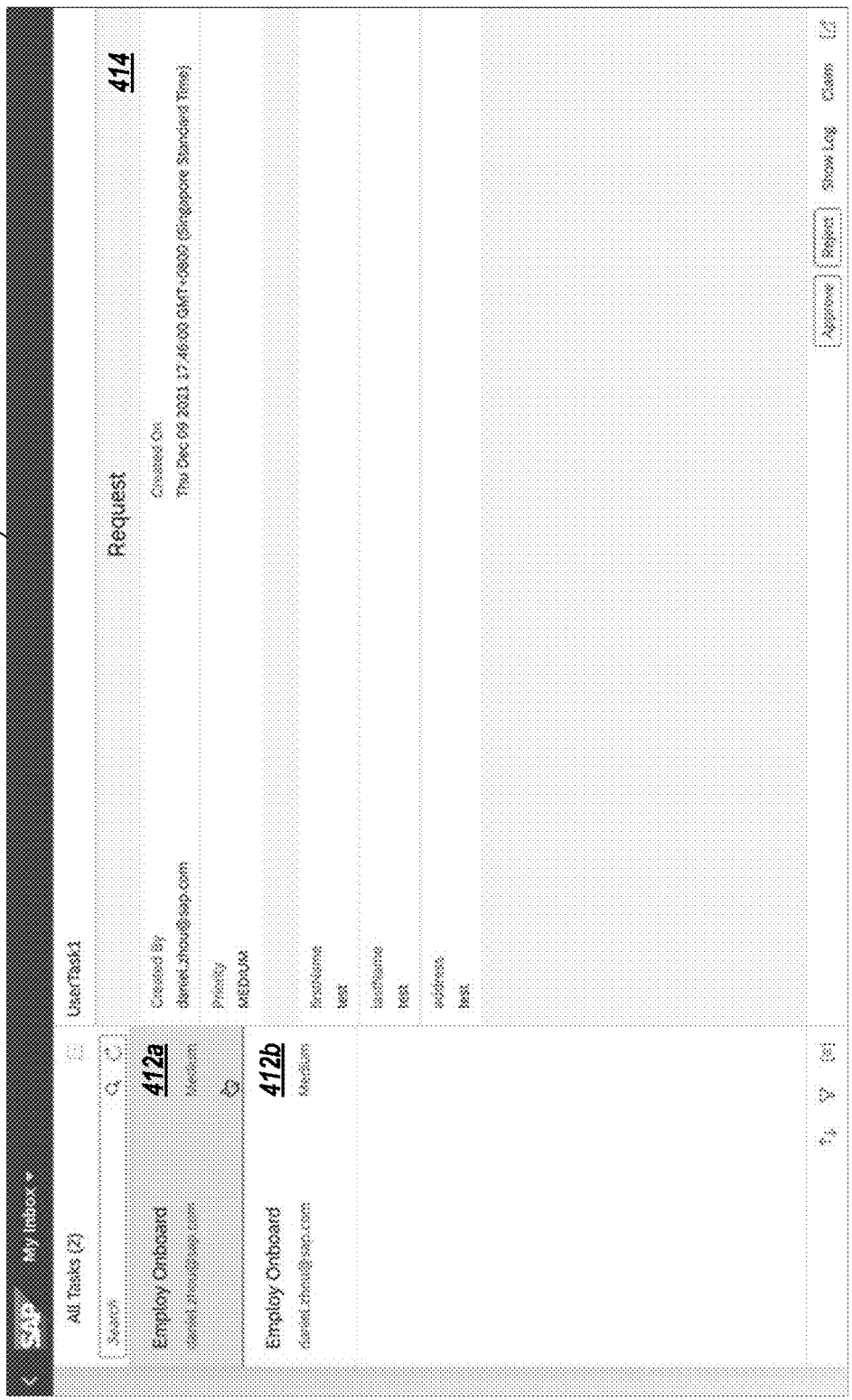

FIGS. 4A and 4B depict example UIs at runtime in accordance with implementations of the present disclosure.

FIG. 4A depicts an example application UI 400 that includes a tile panel 402 depicting a set of tiles, each tile representative of an application (also referred to as tools in the example of FIG. 4A) that a user has access to. In the example of FIG. 4A, a tile 404 corresponds to an application, in which the user has one or more tasks of a workflow to perform. The tile 404 corresponds to the My Inbox application introduced above by way of example. In the example of FIG. 4A, the tile 404 includes a counter (e.g., equal to 2) that indicates a number of tasks within the application that the user is to perform. To view the tasks, the user can select (e.g., click-on) the tile 404.

In some examples, in response to user selection of the tile 404, an application interface 410 is displayed, as depicted in FIG. 4B. In the example of FIG. 4B, representations 412a, 412b of pending workflow tasks are displayed on the lefthand side, and a workflow task UI 414 of a selected task is displayed on the righthand side. That is, in the example of FIG. 4B, the workflow tasks UI 414 corresponds to the representation 412a of a pending workflow task, and displays information associated with the pending workflow task (e.g., task created by, task creation date, priority, information from a data model). Further, decision buttons that enable the user to execute the workflow task are displayed. In the example of FIG. 4B, and in the example context of the employee onboarding task introduced above, the decision buttons include an approve button and a reject button. As discussed above, each decision button can include a visual treatment based on an appearance type selected for the respective decision button. For example, the accept button can be assigned a positive appearance type and can receive a green visual treatment, while the reject button can be assigned a negative appearance type and can receive a red visual treatment. The user can select a decision button in performance of the workflow task.

In accordance with implementations of the present disclosure, when a decision button is selected (e.g., clicked on), the decision ID assigned to the decision button is passed from the container component to the metadata layer, and is stored in the client data model of the runtime. For example, the decision ID is passed using a Window.PostMessage( ) communication channel. In some examples, the decision ID is automatically bound to the corresponding properties within metadata of an update entity, as represented in Listing 5, below. The update entity can be described as action metadata (MDK Action metadata) that is located in the task UI metadata application. In some examples, the update entity action will be executed when the user clicks the Approve or Reject button, for example, in the task UI. The corresponding decision ID will be updated to the workflow backend through the update entity action to complete the workflow. That is, the decision ID is sent to the workflow backend to complete the workflow task instance at runtime.

Listing 5: Actions for Decision Button Selection

```
{
  "_Type": "Action.Type.ODataService.UpdateEntity",
  "Target": {
    "EntitySet": "capex",
    "Service": "/MyApp/Services/service1.service",
    "QueryOptions":
"$filter={{#Application/#ClientData/WorkflowUsertask/taskData/
capEntityFilter}}"
  },
```

-continued

Listing 5: Actions for Decision Button Selection

```
"Properties": {
    "taskDecisionId":
"{#Application/#ClientData/WorkflowUsertask/taskAction/taskDec
isionID}",
    "taskInstanceId":
"{#Application/#ClientData/WorkflowUsertask/taskData/InstanceI
D}"
  },
  "UpdateLinks": [ ],
  "ActionResult": {
    "_Name": "update"
  },
  "OnSuccess":
"/MyApp/Rules/UserTask/OnDecisionUpdateEntitySuccess.js",
  "OnFailure":
"/MyApp/Actions/UserTask/DecisionUpdateEntityFailureMessage.ac
tion"
}
```

Figure 5:
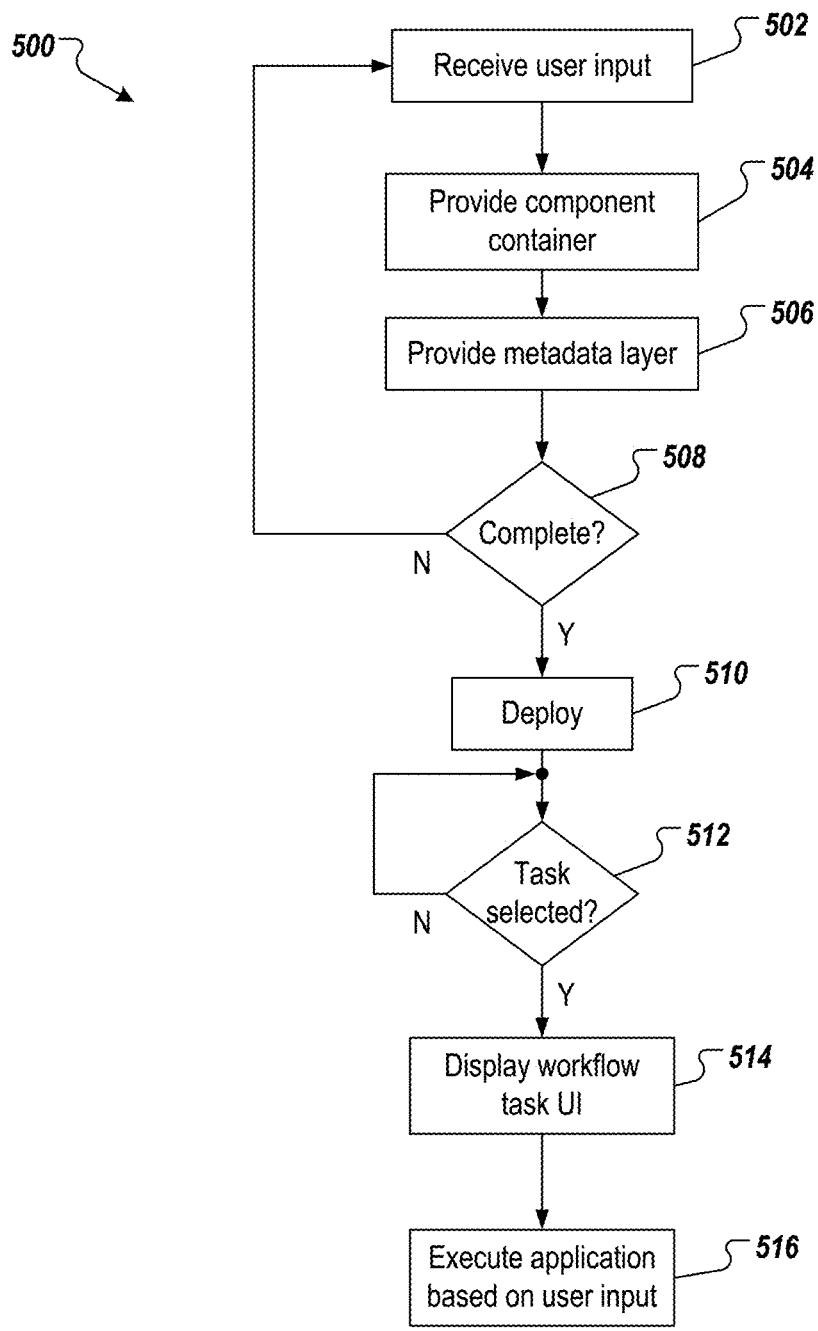
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

User input is received (502). For example, and as described herein, user input representative of user selection of a set of decision elements to be included in a workflow task UI and at least one data object that is to be affected by input to the workflow task UI is received by the design-time environment 220 of FIG. 2. In some examples, each decision element is associated with a decision identifier. For example, and as described herein with reference to FIGS. 3D and 3E, a data object selection panel 310 is displayed and enables the user to select one or more data objects that users will be able to access through the workflow task UI, and a decision button panel 312 is displayed that enables the user to define one or more decision buttons (also referred to as UI elements and/or decision elements) to be included in the workflow task UI, where a decision ID is assigned to each decision button. In some examples, the decision ID is assigned to the decision point defined in the underlying workflow model.

A component container is provided (504) and a metadata layer is provided (506). For example, and as described herein, the design-time environment provides the workflow task UI as one or more computer-executable files that are executable to provide a container component and metadata, the container component storing parameters of the application at run-time, the metadata including logic that is executable within a view of the container component during run-time. In some examples, the parameters include a data model of the task and an identifier of a service entity associated with an instance of the workflow task UI.

It is determined whether design of the workflow task UI is complete (508). For example, and as described herein with reference to FIG. 3E, the user can select a finish button to complete generation of the workflow task UI. As discussed herein, the generated workflow task UI includes a container component layer including the container component and a metadata layer including the metadata. The application is deployed for production use (510). For example, and as described herein with reference to FIG. 2, the application 222 is deployed within the application platform 202 to enable users 242 to interact with the application and execute workflow tasks using workflow tasks UIs.

It is determined whether a task is selected (512). For example, and as described herein with reference to FIGS. 4A and 4B, the tile 404 corresponds to the application, in which the user has one or more tasks of a workflow to perform. The tile 404 corresponds to the My Inbox application introduced above by way of example. In the example of FIG. 4A, the tile 404 includes a counter (e.g., equal to 2) that indicates a number of tasks within the application that the user is to perform. To view the tasks, the user can select (e.g., click-on) the tile 404.

Figure 6:
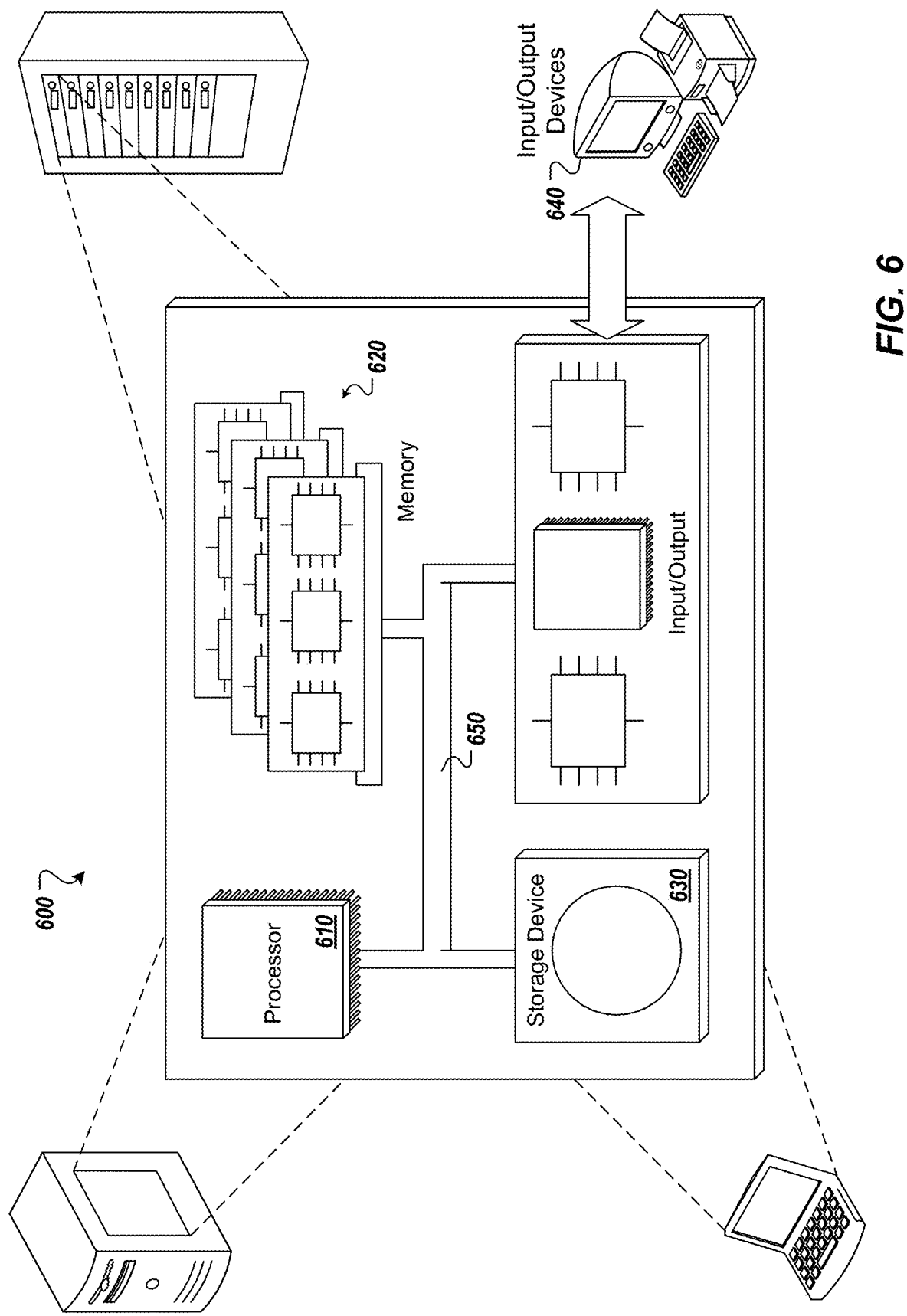
FIG. 6 is a schematic illustration of example computer systems that can be used to execute implementations of the present disclosure.

A workflow task UI is displayed (514). For example, and as described herein with reference to FIG. 4B, in response to the user selecting the tile 404, an application interface 410 is displayed with representations 412a, 412b of pending workflow tasks are displayed on the lefthand side, and a workflow task UI 414 of a selected task is displayed on the righthand side. The application is executed based on user input (516). For example, and as described herein, user input is received to a decision element within the view of the container component, and in response, a decision identifier associated with the decision element is passed from the container component to the metadata, and at least a portion of the logic of the metadata is executed to update the decision identifier with a workflow backend to complete the task. More particularly, and as described herein, when a decision button is selected (e.g., clicked on), the decision ID assigned to the decision button is passed from the container component to the metadata layer, and is stored in the client data model of the runtime. For example, the decision ID is passed using a Window.PostMessage( ) communication channel. In some examples, the decision ID is automatically bound to the corresponding properties within metadata of an update entity, and an update entity action will be executed. The corresponding decision ID will be updated to the workflow backend through the update entity action to complete the workflow. That is, the decision ID is sent to the workflow backend to complete the workflow task Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing workflow task user interfaces (UIs) for an application, the method being executed by one or more processors and comprising:
   receiving, by a design-time environment of an application platform, user input representative of user selection of a set of decision elements to be included in a workflow task user interface (UI) and at least one data object that is to be affected by input to the workflow task UI, each decision element being associated with a decision identifier;
   providing, by the design-time environment, the workflow task UI as one or more computer-executable files that are executable to provide a container component and metadata, the container component storing parameters of the application at run-time, the metadata comprising logic that is executable within a view of the container component during run-time;
   determining whether design of the workflow task UI is complete; and
   based on the workflow task UI design being complete, generating the workflow task UI which includes the container component and the metadata;
   during run-time use of the application:
      displaying the workflow task UI to enable a user to execute a respective task of a workflow, and
      receiving user input to a decision element within the view of the container component, and in response:
         passing a decision identifier associated with the decision element from the container component to the metadata, the decision identifier being bound to UI controls and properties within metadata of an update entity action, and
         executing the update entity action to update the decision identifier with sending the decision identifier to a workflow backend to complete the respective task of the workflow.

2. The method of claim 1, wherein the decision identifier is passed using Hypertext transfer protocol (HTTP) post message.

3. The method of claim 1, wherein the parameters comprise a data model of the respective task of the workflow and an identifier of a service entity associated with an instance of the workflow task UI.

4. The method of claim 3, wherein the data model and the identifier of the service entity are stored in a client data model of a runtime of the application.

5. The method of claim 1, wherein the parameters are passed from the container component to the metadata using a Hypertext transfer protocol (HTTP) post message.

6. The method of claim 1, wherein displaying the workflow task UI comprises populating data of the at least one data object within the workflow task UI and displaying decision elements of the set of decision elements within the workflow task UI.

7. The method of claim 1, wherein the workflow is defined within a computer-readable workflow model that defines tasks and decision points of tasks, each decision element in the set of decision elements being associated with a decision point of the computer-readable workflow model.

8. A non-transitory computer-readable storage medium coupled to one or more processors and having instructions stored thereon which, when executed by the one or more processors, cause the one or more processors to perform operations for providing workflow task user interfaces (UIs) for cloud-based applications, the operations comprising:
  receiving, by a design-time environment of an application platform, user input representative of user selection of a set of decision elements to be included in a workflow task user interface (UI) and at least one data object that is to be affected by input to the workflow task UI, each decision element being associated with a decision identifier;
  providing, by the design-time environment, the workflow task UI as one or more computer-executable files that are executable to provide a container component and metadata, the container component storing parameters of the application at run-time, the metadata comprising logic that is executable within a view of the container component during run-time;
  determining whether design of the workflow task UI is complete; and
  based on the workflow task UI design being complete, generating the workflow task UI which includes the container component and the metadata;
  during run-time use of the application:
    displaying the workflow task UI to enable a user to execute a respective task of a workflow, and
    receiving user input to a decision element within the view of the container component, and in response:
      passing a decision identifier associated with the decision element from the container component to the metadata, the decision identifier being bound to UI controls and properties within metadata of an update entity action, and
      executing the update entity action to update the decision identifier with sending the decision identifier to a workflow backend to complete the respective task of the workflow.

9. The non-transitory computer-readable storage medium of claim 8, wherein the decision identifier is passed using Hypertext transfer protocol (HTTP) post message.

10. The non-transitory computer-readable storage medium of claim 8, wherein the parameters comprise a data model of the respective task of the workflow and an identifier of a service entity associated with an instance of the workflow task UI.

11. The non-transitory computer-readable storage medium of claim 10, wherein the data model and the identifier of the service entity are stored in a client data model of a runtime of the application.

12. The non-transitory computer-readable storage medium of claim 8, wherein the parameters are passed from the container component to the metadata using a Hypertext transfer protocol (HTTP) post message.

13. The non-transitory computer-readable storage medium of claim 8, wherein displaying the workflow task UI comprises populating data of the at least one data object within the workflow task UI and displaying decision elements of the set of decision elements within the workflow task UI.

14. The non-transitory computer-readable storage medium of claim 8, wherein the workflow is defined within a computer-readable workflow model that defines tasks and decision points of tasks, each decision element in the set of decision elements being associated with a decision point of the computer-readable workflow model.

15. A system, comprising: a computing device; and
  a non-transitory computer-readable storage device coupled to the computing device and having instructions stored thereon which, when executed by the computing device, cause the computing device to perform operations for natural language explanations for providing workflow task user interfaces (UIs) for cloud-based applications, the operations comprising:
    receiving, by a design-time environment of an application platform, user input representative of user selection of a set of decision elements to be included in a workflow task user interface (UI) and at least one data object that is to be affected by input to the workflow task UI, each decision element being associated with a decision identifier;
    providing, by the design-time environment, the workflow task UI as one or more computer-executable files that are executable to provide a container component and metadata, the container component storing parameters of the application at run-time, the metadata comprising logic that is executable within a view of the container component during run-time; and
  determining whether design of the workflow task UI is complete; and
  based on the workflow task UI design being complete, generating the workflow task UI which includes the container component and the metadata;
    during run-time use of the application:
      displaying the workflow task UI to enable a user to execute a respective task of a workflow, and
      receiving user input to a decision element within the view of the container component, and in response:
        passing a decision identifier associated with the decision element from the container component to the metadata, the decision identifier being bound to UI controls and properties within metadata of an update entity action, and
        executing the update entity action to update the decision identifier with sending the decision identifier to a workflow backend to complete the respective task of the workflow.

16. The system of claim 15, wherein the decision identifier is passed using Hypertext transfer protocol (HTTP) post message.

17. The system of claim 15, wherein the parameters comprise a data model of the respective task of the workflow and an identifier of a service entity associated with an instance of the workflow task UI.

18. The system of claim 17, wherein the data model and the identifier of the service entity are stored in a client data model of a runtime of the application.

19. The system of claim 15, wherein the parameters are passed from the container component to the metadata using a Hypertext transfer protocol (HTTP) post message.

20. The system of claim 15, wherein displaying the workflow task UI comprises populating data of the at least one data object within the workflow task UI and displaying decision elements of the set of decision elements within the workflow task UI.

* * * * *